United States Patent
Takashima

[19]

[11] Patent Number: 6,011,594
[45] Date of Patent: Jan. 4, 2000

[54] TELEVISION DEVICE HAVING TEXT DATA PROCESSING FUNCTION

[75] Inventor: Tadao Takashima, Fukaya, Japan

[73] Assignee: Kabushiki Kaisha Toshiba, Kawasaki, Japan

[21] Appl. No.: 08/888,240

[22] Filed: Jul. 3, 1997

[30] Foreign Application Priority Data

Jul. 5, 1996 [JP] Japan .................................... 8-176433

[51] Int. Cl.$^7$ ........................... H04N 7/087; H04N 5/445
[52] U.S. Cl. ........................ 348/565; 348/468; 348/563; 348/568; 348/705
[58] Field of Search .................................... 348/468, 563, 348/564, 565, 566, 567, 568, 569, 570, 571, 705, 706, 731

[56] References Cited

U.S. PATENT DOCUMENTS

| | | | |
|---|---|---|---|
| 4,635,121 | 1/1987 | Hoffman et al. | 358/188 |
| 4,800,428 | 1/1989 | Johanndeiter et al. | 358/142 |
| 5,121,476 | 6/1992 | Yee | 395/154 |
| 5,610,664 | 3/1997 | Bobert | 348/564 |
| 5,691,778 | 11/1997 | Song | 348/564 |
| 5,708,475 | 1/1998 | Hayashi | 348/468 |
| 5,721,593 | 2/1998 | Suh | 348/564 |
| 5,734,436 | 3/1998 | Abe et al. | 348/564 |
| 5,757,437 | 5/1998 | Song | 348/564 |
| 5,786,869 | 7/1998 | Baek | 348/565 |
| 5,790,204 | 8/1998 | Yamaguchi | 348/564 |
| 5,801,785 | 9/1998 | Crump et al. | 348/563 |
| 5,805,230 | 9/1998 | Staron | 348/460 |
| 5,900,916 | 5/1998 | Yamagushi | 348/564 |

FOREIGN PATENT DOCUMENTS 7-249535  9/1995  Japan .

OTHER PUBLICATIONS

Patent Abstracts of Japan, vol. 014, No. 483 (E–0993), Oct. 22, 1990 & JP 02 198284 A (Fujitsu General Ltd), Aug. 6, 1990.

Patent Abstracts of Japan, vol. 097, No. 007, Jul. 31, 1997 & JP 09 070025 A (Toshiba Corp; Toshiba Ave Corp), Mar. 11, 1997.

Patent Abstracts of Japan, vol. 096, No. 009 Sep. 30, 1996 & JP 08 140064 A (Sony Corp) May 31, 1996.

Patent Abstracts of Japan, vol. 018, No. 155 (E–1524), Mar. 15, 1994 & JP 05 328319 A (Matsushita Electric Ind Co Ltd), Dec. 10, 1993.

*Primary Examiner*—Michael H. Lee
*Assistant Examiner*—Wesner Sajous
*Attorney, Agent, or Firm*—Pillsbury Madison & Sutro LLP

[57] ABSTRACT

This invention provides a television device in which text data can be continuously and stably obtained even when the switching the reception between a plurality of tuners. Outputs of first and second signals are inputted into and demodulated by video processing circuits. One of the outputs of the video processing circuits is selected by a selector and inputted into a text decoder. In a case where the reception channel of the first tuner is switched to a channel received by the second tuner under a condition that the selector selects the output of the video processing circuit, the selector is switched to select the output of the video processing circuit after the reception state of the first tuner becomes stable.

4 Claims, 7 Drawing Sheets

TELEVISION DEVICE HAVING TEXT DATA PROCESSING FUNCTION

BACKGROUND OF THE INVENTION

1. Field of Invention

This invention relates to a television device which has a text data processing function and a multiscreen display function and which can receive and display text data in addition to a television signal.

2. Description of Related Art

Recently, wide-screen television devices that have an oblong picture tube for a wide screen and an aspect ratio of 16:9 are widely used. A multiscreen system supports displaying a plurality of images with an aspect ratio of 4:3 on the wide screen by making use of the benefits of the wide screen. The television device of the multiscreen system can display two images. The first image is compressed in the horizontal direction as a parent screen on one side of the wide screen and the second compressed image as a child screen on a space area on the other side of the wide screen. This display mode is known as PIP (Picture In Picture). Further, in a television device of double-screen system (or double-window system), the wide screen can be divided into right and left areas of the same size and images of different broadcasting programs can be simultaneously displayed on the right and left shared screens.

In order to display two images, conventional television devices have two different tuners.

Further, one type of recent broadcasting is a data broadcasting program for transmitting text data multiplexed with the television signal. The text data is multiplexed in the vertical blanking period of the television signal.

One application of the double-screen television device occurs when a normal television broadcasting program and a data broadcasting program are received and an image of the normal television broadcasting program is displayed on one of the shared screens, and an image of the text data of the data broadcasting program is displayed on the other shared screen.

As described above, the double-screen system can be utilized in various configurations of display types. For example a one-screen display mode in which a normal television broadcasting program is received by use of only the first tuner and the image is displayed on the entire area of the wide screen. Another example is a double-screen display mode in which normal television broadcasting programs are received by use of the first and second tuners and respective images are displayed on the left and right screens or a double-screen display mode in which text data is displayed on one of the screens.

However, when the position of the user who utilizes the double-screen system is taken into consideration, a problem may occur particularly when a data broadcast is received. The user does not always fully understand the broadcasting system of text data and the broadcasting system of television program.

Assuming that a normal television broadcast is received by the first tuner of the television receiver of double-screen system, the program is displayed on one of the double screens, a data broadcast is received by the second tuner, and the text data is displayed on the other screen of the double screens. Further, assume that, in this situation, the user watching and listening to the broadcast takes an interest in the text data, sets the one-screen display mode and sets the state in which the data broadcast is received by the first tuner.

In the above case, information pertaining to of the data broadcast supplied to a decoder for the text data cannot be obtained until the operation of the first tuner becomes stabilized. As a result, it is sometimes impossible to see important text data.

BRIEF SUMMARY OF THE INVENTION

Accordingly, an object of this invention is to provide a television device that has a text data processing function capable of stably receiving text data even when one of a plurality of tuners is selectively switched to receive a data broadcast.

In order to attain the above object, there is a television device that includes a first tuner, a second tuner, a selector for selectively supplying a reception output of one of the first and second tuners to a text decoder, and a control means for controlling the operation of the television device. The control means keeps the channel selecting states of the first and second tuners in an overlapped state for a preset period of time when the first tuner is selected to receive a channel which is the same as a channel which gives a data broadcast received by the second tuner under a condition that the control means controls the selector to cause a reception output of the second tuner to be supplied to the text decoder. The control means also controls the selector to supply a reception output of the first tuner to the text decoder when the reception state of the first tuner becomes stable.

By use of the above control means, the text decoder can stably acquire continuous text data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The following describes an embodiment of this invention with reference to accompanying drawings.

Figure 1:
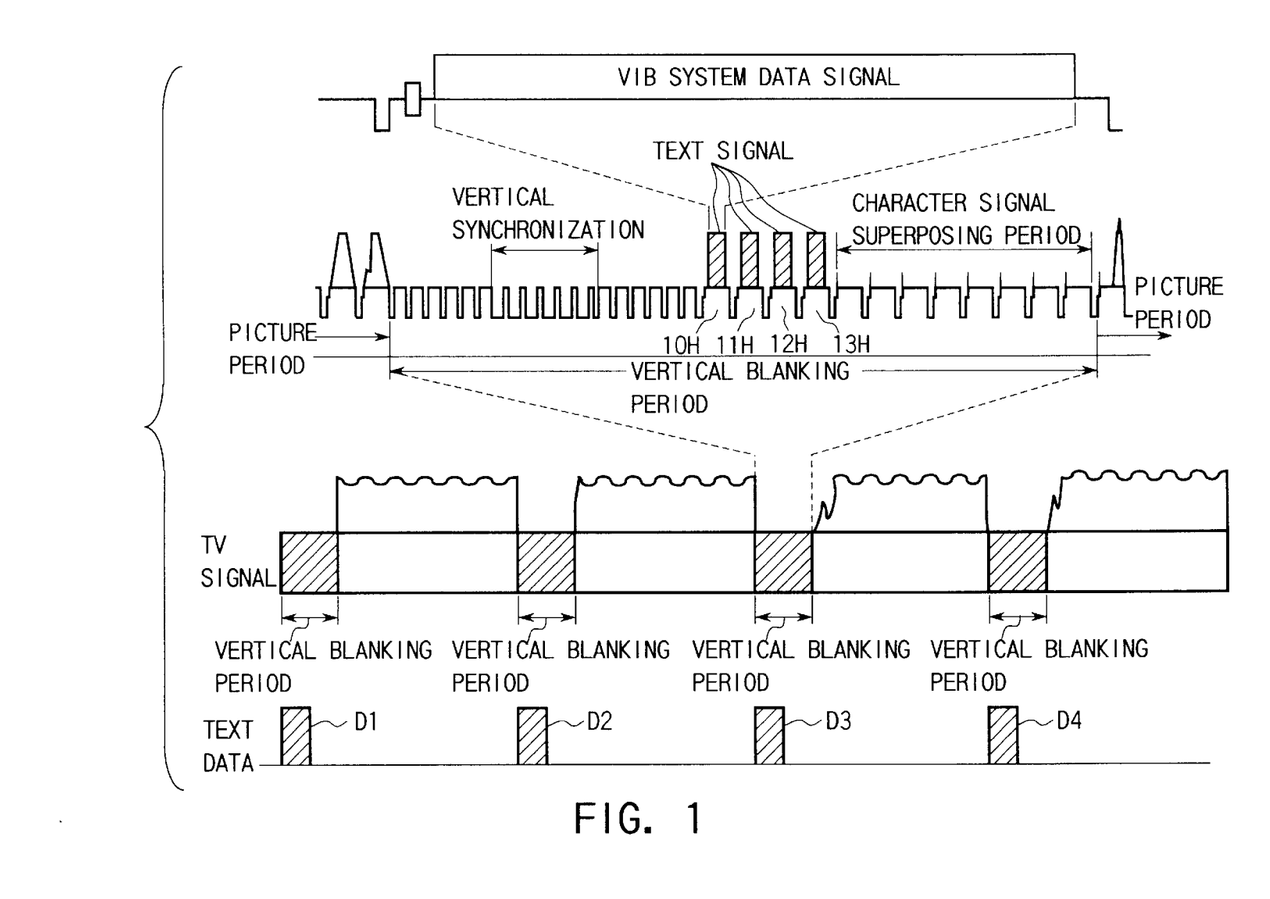
FIG. 1 is a diagram for illustrating text data.

FIG. 1 shows the positional relation of data items that have text signals inserted into a television signal of normal NTSC system. As illustrated, text signals D1 to D4 are transmitted in the respective vertical blanking periods. The text signal is inserted into the tenth horizontal period (10 H) to the thirteenth horizontal period (13 H) of the vertical blanking period in the same manner as in the multiplexed text system. The multiplexed text signal is repeatedly broadcasted, but the text signal is broadcasted as real-time information synchronized with the corresponding main program. Of course, the text signal may be broadcasted repeatedly in the same manner as the multiplexed text signal.

Figure 2:
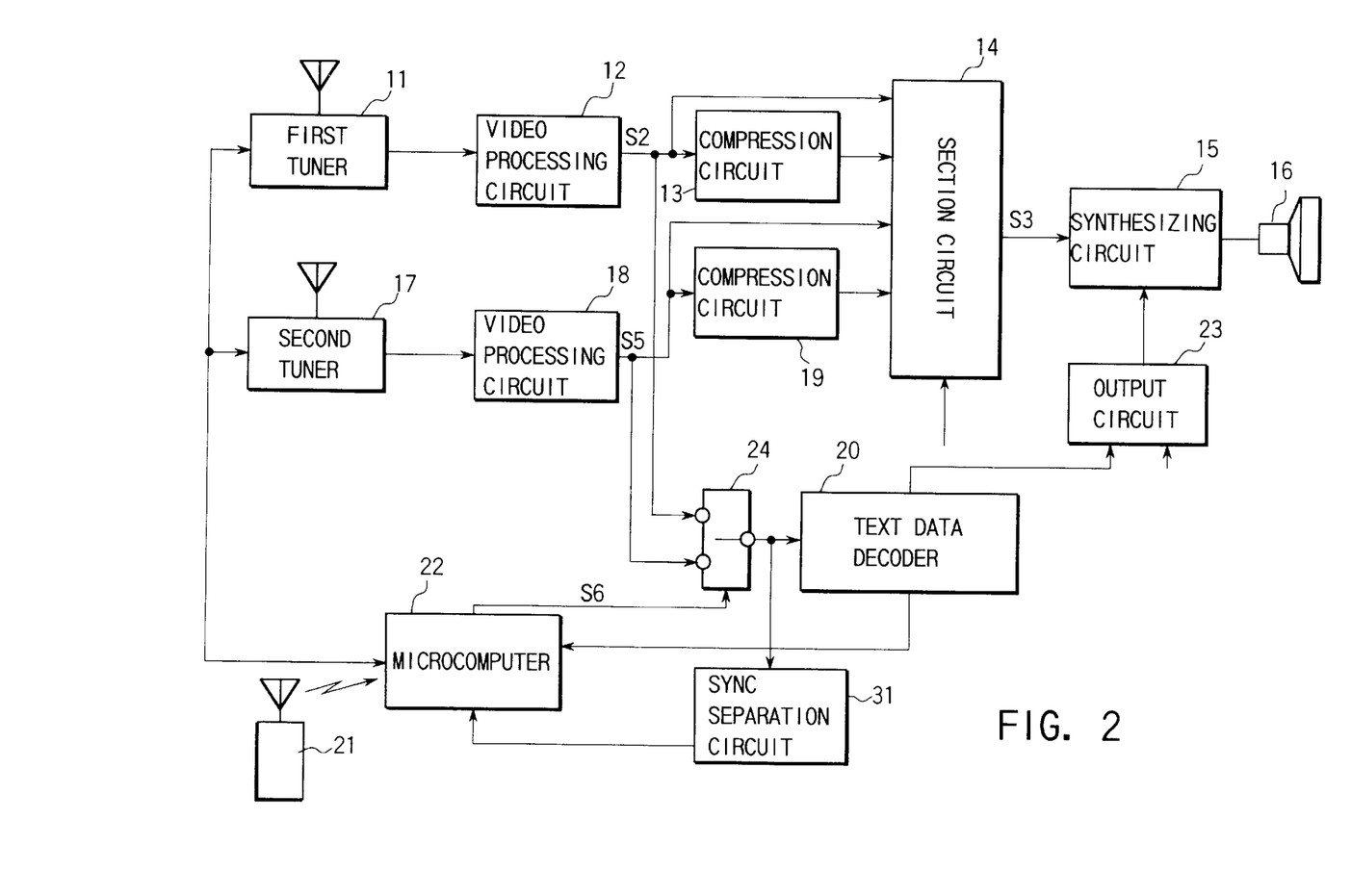
FIG. 2 is a block diagram showing the construction of a television device having a text data processing function according to one embodiment of this invention.

FIG. 2 shows a television device having a function of processing the above text data.

The television device has two systems. Each system includes a receiving system such as a tuner for receiving ground waves in order to make full use of the double-screen function. A television signal S1 output from a first tuner 11 is supplied to a video processing circuit 12. The video processing circuit 12 outputs a video signal S2 and supplies the video signal S2 to a compression circuit 13 and selection circuit 14 simultaneously.

A memory (not shown) is connected to the compression circuit 13 so that a compressed still picture can be stored and pictures of the respective channels can be sequentially stored and read out in the channel search mode.

A video signal outputted from the compression circuit 13 is supplied to the selection circuit 14. A video signal S3 selected by the selection circuit 14 is converted into an analog signal by a synthesizer circuit 15 and then supplied to a color cathode ray tube 16 for image display.

On the other hand, a television signal S4 outputted from a second tuner 17 is supplied to a video processing circuit 18. A video signal S5 which is outputted from the video processing circuit 18 is supplied to a compression circuit 19 and the selection circuit 14. A video signal S3 selected by the selection circuit 14 is supplied to the color cathode ray tube 16 via the synthesizing circuit 15 and a corresponding image is displayed.

Further, the output video signal S2 of the video processing circuit 12 is supplied to one of two terminals of a selector 24. The output video signal S5 of the video processing circuit 18 is supplied to the other terminal of the selector 24. A signal selected by the selector 24 is inputted into a text data decoder 20. If the text data decoder 20 is switched into a text processing mode via a microcomputer 22 by the operation of a remote controller 21, a text data processing operation is effected. An output signal obtained by the text processing operation is supplied to the synthesizing circuit 15 via an output circuit 23 in which the output timing is controlled. As a result, the text image is superposed on the image output from the selection circuit 14 and displayed.

The above television device is normally constructed such that the video processing circuit 12 has a higher performance and provides an image of higher image quality in comparison with the video processing circuit 18.

Further, in the above television device, an output signal of the selector 24 is supplied to a sync separation circuit 31. A synchronizing signal separated in the sync separation circuit 31 is supplied to the microcomputer 22. Further, the selector 24 is controlled by a switching control signal S6 from the microcomputer 22.

The microcomputer 22 is designed to control the switching position of the selector 24 in a period other than the period of the synchronizing signal supplied from the sync separation circuit 31 when controlling the selector 24.

The above device can implement various display methods.

First, the channel of the system including the video processing circuit 12 is selected to perform the normal image display. At this time, the one-screen display mode is specified and the output video signal S2 from the video processing circuit 12 is selected by the selection circuit 14, supplied to the color cathode ray tube 16 via the synthesizing circuit 15 and displayed on the color cathode ray tube.

Next, when the double-screen display mode is specified, the video signal S2 of the video processing circuit 12 is compressed to ½ in the horizontal direction by the compression circuit 13 and the video signal S5 of the video processing circuit 18 is compressed by half in the horizontal direction by the compression circuit 19. The selection circuit 14 alternately selects the outputs of the compression circuits 13 and 19 for every ½ horizontal period and supplies the selected output to the synthesizing circuit 15. As a result, a video image of a channel selected by the first tuner 11 is displayed on the left side of the display screen and a video image of a channel selected by the second tuner 17 is displayed on the right side of the display screen.

The output video signals of the video processing circuits 12 and 18 are supplied to and synchronized by a synchronization processing circuit (not shown) and then outputted.

Figure 3A:
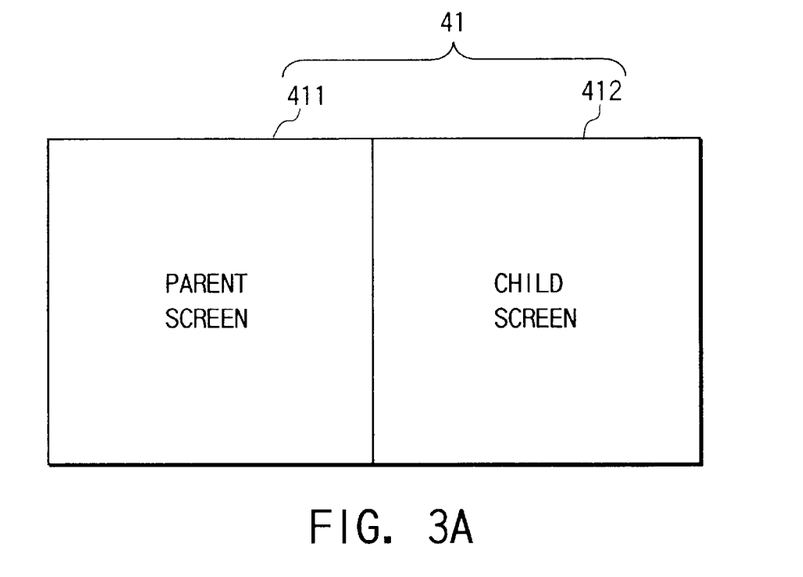
FIG. 3A is a diagram showing the double-screen display state in the above embodiment.

In the double-screen display mode, the television signal S1 received by the first tuner 11 is displayed as a parent picture on a left screen 411 of a wide screen 41 as shown in FIG. 3A. The television signal S4 received by the second tuner 17 is displayed as a child picture on a right screen 412 of the wide screen 41 as shown in FIG. 3A. In the one-screen display mode, the parent picture is displayed on the entire area of the wide screen 41 as shown in FIG. 3B.

Figure 3B:
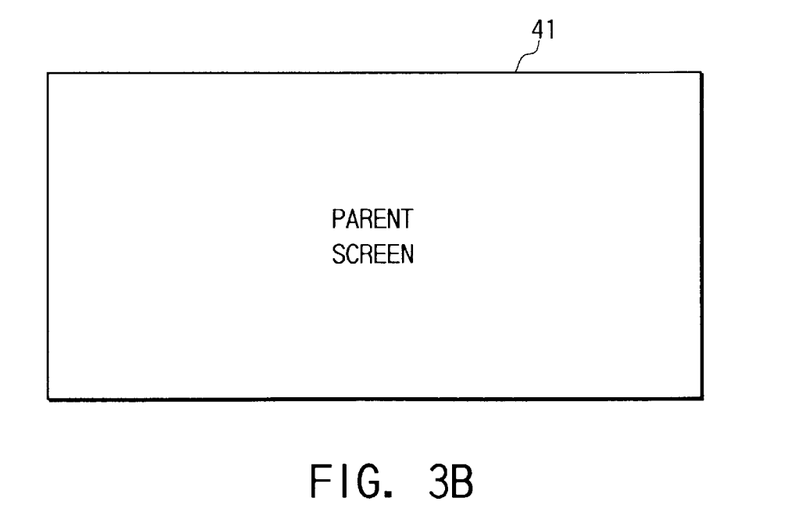
FIG. 3B is a diagram showing the one-screen display state in the above embodiment.

The following example describes when text data is first displayed on the screen 412 and then the text data display state is switched to the display state in the wide screen as shown in FIG. 3B.

Figure 4A:
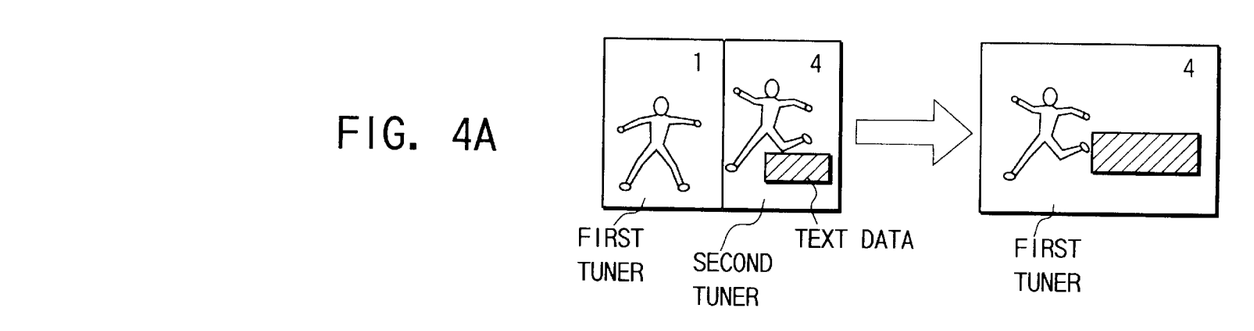
FIG. 4A is a diagram showing the state of the display screen when the display state is switched from the double-screen display state to the one-screen display state.

Assume that a double-screen display state in which a video image of a first channel by the first tuner is displayed on the left screen and text data and a video image of a fourth channel by the second tuner 17 are displayed on the right screen (the text data decoder 20 selects the second tuner 17 side) is set as shown in FIG. 4A. Further, assume that the display state is switched from the present state to a state in which the video image of channel 4 and text data are displayed on the entire area of the wide screen.

Figures 4B, 4C:
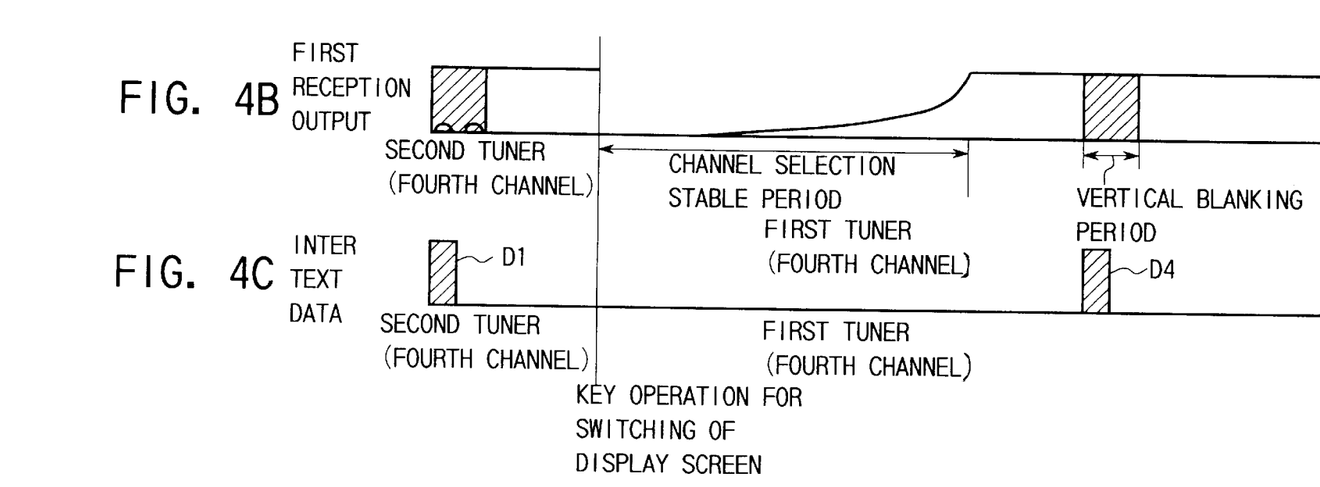
FIGS. 4B and 4C are diagrams for illustrating a problem occurring when the display state is switched from the double-screen display state to the one-screen display state.

When the display state is switched from the double-screen display state to the one-screen display state, the operation state of the first tuner 11 is switched from a state in which channel 1 is received to a state in which channel 4 is received and results in an unstable state until the channel selection is completed (refer to FIG. 4B).

The unstable state occurs because it takes a long time to correctly perform the AGC (Automatic Gain Control) and the conversion of PLL (Phase Locked Loop) data of the selection circuit at the time of channel switching. Therefore, in a preset period of time after the screen switching operation has been effected, the reception signal in the system of the first tuner becomes unstable and text data cannot be correctly reproduced (refer to FIG. 4C).

Therefore, it is problematic if the selector 24 is immediately switched to select an output of the first video processing circuit 12. That is, part of text data is lost in the unstable period as shown in FIG. 4C and part of the text data transmitted on the real-time basis is missed. For example, information such as an address and telephone number transmitted as text data may be lost.

One application of text data broadcasting, is teleshopping. For example goods or articles are introduced in a television program, and information such as the article codes of the respective articles and the dealing shops are transmitted as text data. If the channel switching operation described above is effected in such a television program, a telephone number for doing the teleshopping is sometimes lost.

In order to solve this problem, the device of this invention incorporates the screen switching operation so as to avoid omitting data.

FIGS. 5A to 5E show the states of outputs and data obtained when the switching position of the selector 24 is controlled when text data is inputted into the parent screen or child screen. When the display mode is switched from the double-screen display mode to the one-screen display mode by operating the remote controller 21, the reception channel of the first tuner 11 is switched to the same channel as the reception channel of the second tuner 17 by the selection control signal from the microcomputer 22. At this time, the selection circuit 14 selects the output signal of the video processing circuit 18 and an image of the television signal S4 (FIG. 5A) that is outputted from the second tuner 17 is displayed on the display screen 41. The selector 24 keeps the state in which the video processing circuit 18 is selected. As a result, text data items D1, D2 are not omitted and can be received into the text data decoder 20. The second tuner 17 continues to receive the program until the first tuner 11 is set to select a channel for a desired program and the image mute is released.

Figure 5A:
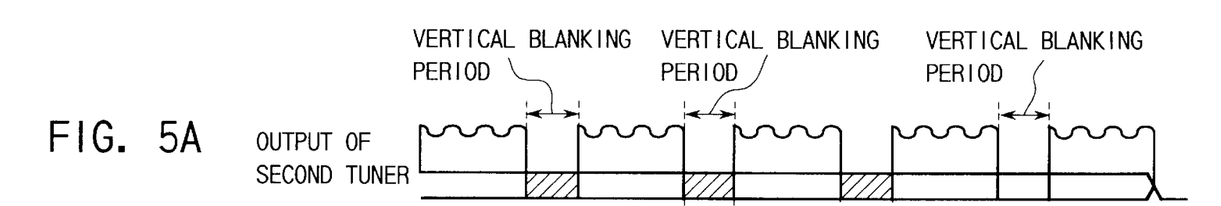
FIGS. 5A to 5E are timing charts for illustrating the operation inherent to the device of this invention.
Figure 5B:
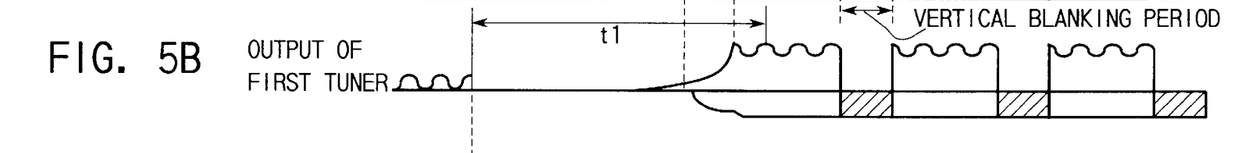

At this time, in the first tuner 11, the reception channel is switched to the same channel as the reception channel of the second tuner 17. Therefore, the television signal S1 is changed to the channel of the television signal S4 that is received by the second tuner 17 after a channel selection stable time t1 has passed as shown in FIG. 5B. At the same time, it is subjected to the IF AGC control.

Figure 5C:
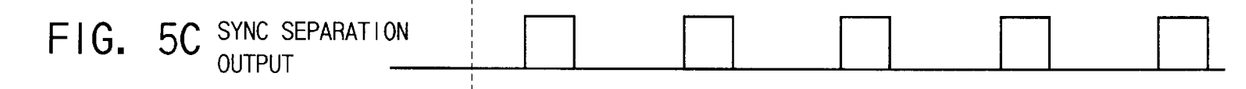
Figure 5D:
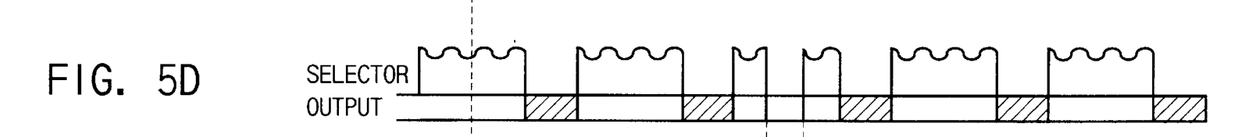
Figure 5E:
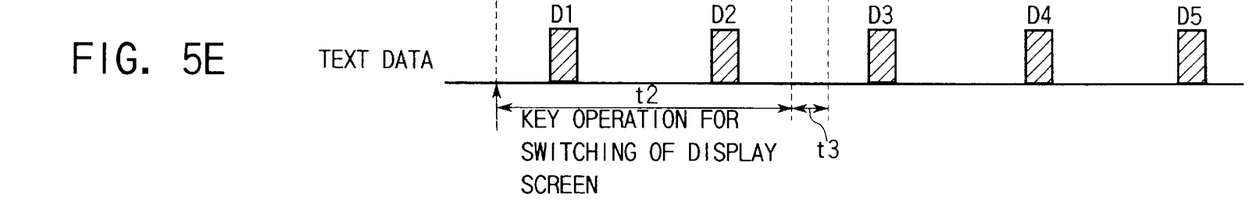

FIG. 5C shows a synchronizing signal output from the sync separation circuit 31. FIG. 5D shows an output of the selector 24. The selector 24 may effect the switching operation when the synchronizing signal output from a sync separation circuit 31 is at the low level or in a period other than the vertical blanking period. The synchronizing signal output from the sync separation circuit 31 shown in FIG. 5C is inputted into the microcomputer 22. The microcomputer 22 sets the channel selection stable time t1 from the operation time of the screen switching key and then changes the switching position of the selector 24 from the second tuner 17 side to the first tuner 11 side in a period of time t3 other than the vertical blanking period. That is, the microcomputer controls the selector 24 to select the output of the video processing circuit 12. Since the stable time t3 of the selector 24 at the time of switching is extremely short and the switching operation is effected for a period other than the vertical blanking period, the text data decoder 20 can receive text data items D3, D4, D5 as shown in FIG. 5E derived from the first tuner 11 side. As a result, text data items D1 to D5 are not lost and can be decoded in the text data decoder 20. After the input of the text data is switched to the first tuner 11, the second tuner 17 is set to receive another channel or set into the OFF state. Even if the time t2 is set as predetermined fixed time, the object of this invention can be attained. Further, it is possible to provide means for positively monitoring and determining whether or not the reception state of the tuner 11 becomes stable in order to determine the switching timing of the selector 24 and use an output of the monitoring means so as to switch the switching position of the selector 24.

Switching the display images on the wide screen is effected by use of the selection circuit 14. The switching can be effected in the horizontal synchronizing signal period or vertical synchronizing signal period, for example.

In the above example, the display mode is switched from the double-screen display mode to the one-screen display mode and the test data reception state of the second tuner side is switched to the text data reception state of the first tuner. However, the concept of this invention is not limited to the above mode switching operation. For example, this invention can be applied in a case wherein the switching operation is effected between the reception channel of the first tuner and the reception channel of the second tuner while the state of the double-screen display mode is maintained. More specifically, the reception channels of one of the tuners which now receives text data and the other tuner which is to receive the text data are controlled to overlap in a preset period of time so to prevent the text data from being lost. After the overlapping period of time has passed, an output of the other (latter) tuner which now receives the text data is supplied to the text data decoder and then the reception state of the former tuner is controlled. During the overlapping period, the text data decoder selects the output of the former tuner.

Figure 6:
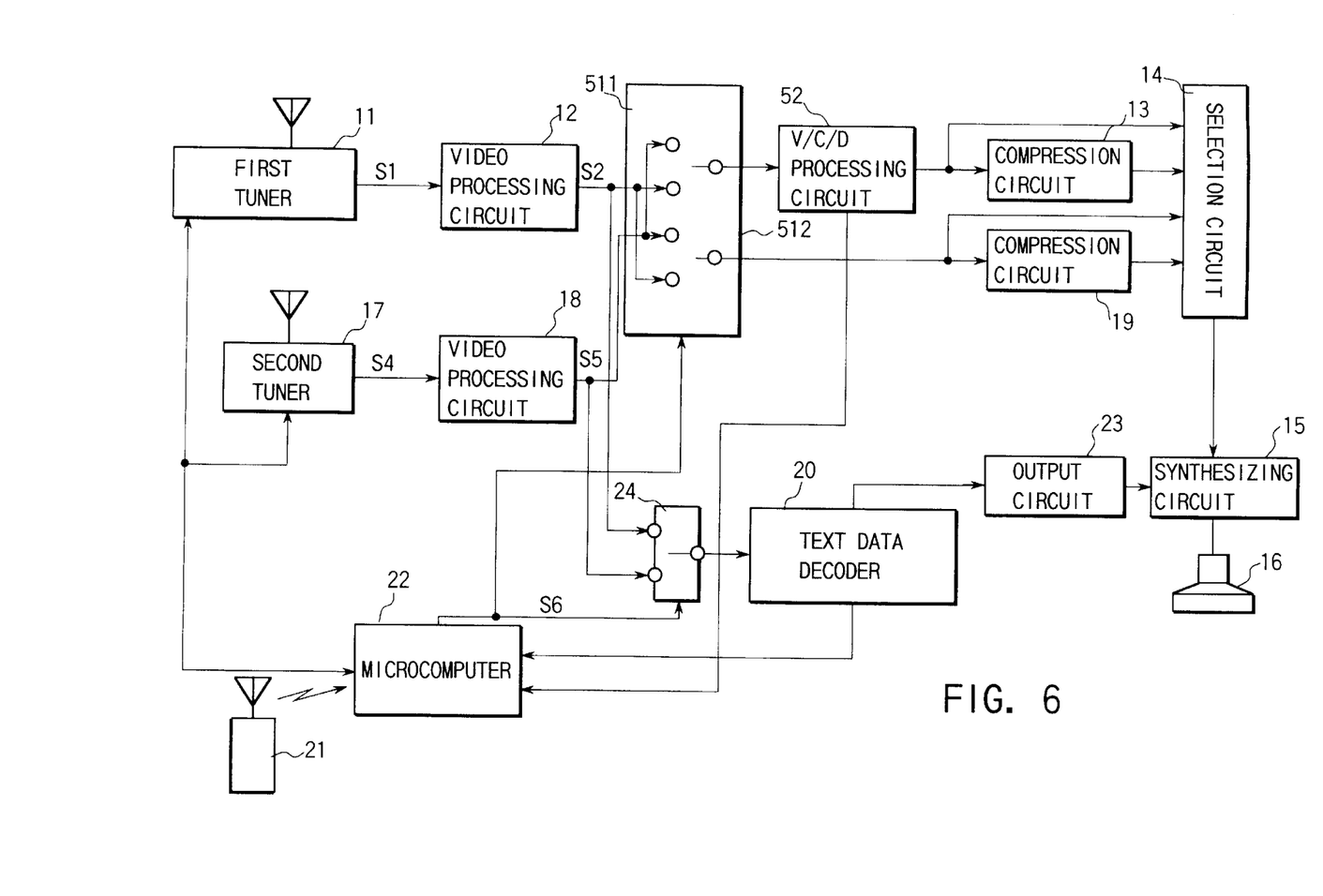
FIG. 6 is a diagram showing another embodiment of this invention.

FIG. 6 shows another embodiment of this invention.

In this embodiment, portions which are the same as those in the former embodiment are denoted by the same reference numerals. This embodiment is different from the former embodiment of FIG. 2 in that an output video signal S2 of the video processing circuit 12 and an output video signal S5 of the video processing circuit 18 are supplied to a switching section 51, one of the two output signals of the switching section 51 is supplied to a V/C/D processing circuit 52, and the other output signal is supplied to the compression circuit 19 and selection circuit 14. The V/C/D processing circuit 52 is a video/chroma/deflection processing circuit, and can adjust the image quality by controlling the luminance signal and can adjust the hue and color balance by controlling the chroma signal. Further, it processes the synchronizing signal for deflection process.

The V/C/D processing circuit 52 processes the output video signal selected and derived by a switch 511 of the switching section 51 and supplies the processed output video signal to the selection circuit 14 and compression circuit 13. Further, the V/C/D processing circuit 52 separates the synchronizing signal from the output video signal selected and derived by the switch 511 of the switching section 51 and supplies the synchronizing signal to the microcomputer 22.

In the switching section 51, the switch 511 normally selects a signal on the first tuner 11 side and a switch 512 selects a signal on the second tuner 17 side.

The switching section 51 is used to replace the right and left images in the double-screen display mode. That is, if the switch 511 is set to select the output on the tuner 17 side and the switch 512 is set to select the output on the tuner 11 side, the images of the right and left positions can be replaced with each other.

Assume now that the display state is switched from the double-screen display state to the one-screen display state as shown in FIG. 4A as in the former embodiment. Therefore, the switch 511 is switched to the second tuner 17 side based on a switching control signal from the microcomputer 22. The V/C/D processing circuit 52 processes the output video signal of the same program as that of the output video signal selected and derived by the switch 512. The selection circuit 14 selects the output signal of the V/C/D processing circuit 52 and outputs the same as a signal for the wide display screen. Further, the reception state of the first tuner 11 is set to the reception state of a channel which is the same as the reception channel of the second tuner 17 in which the text broadcasting is performed.

As a result, an image of the channel received by the second tuner 17 and text data are displayed on the wide display screen.

The reception state of the first tuner 11 becomes stable after a preset period of time. Then, the microcomputer 22 controls the switch 511 to select the video signal on the first tuner 11 side. Further, when the switching position of the selector 24 is switched, the microcomputer 22 monitors the synchronizing signal from the V/C/D processing circuit 52 and controls the selector 24 to select the signal on the first tuner 11 side in a period other than the period of the vertical synchronizing signal.

According to the above embodiment, an example in which the double-screen display mode is used is explained, but it is of course possible to apply this invention to the multiscreen display and PIP process. Further, as data dealt in the text data decoder 20, various data items such as an script used in another data broadcasting and inter text data can be used.

As described above, according to this invention, text data can be continuously received even when the switching operation of reception between a plurality of tuners is effected and the text data process of high reliability can be attained.

Figure 7:
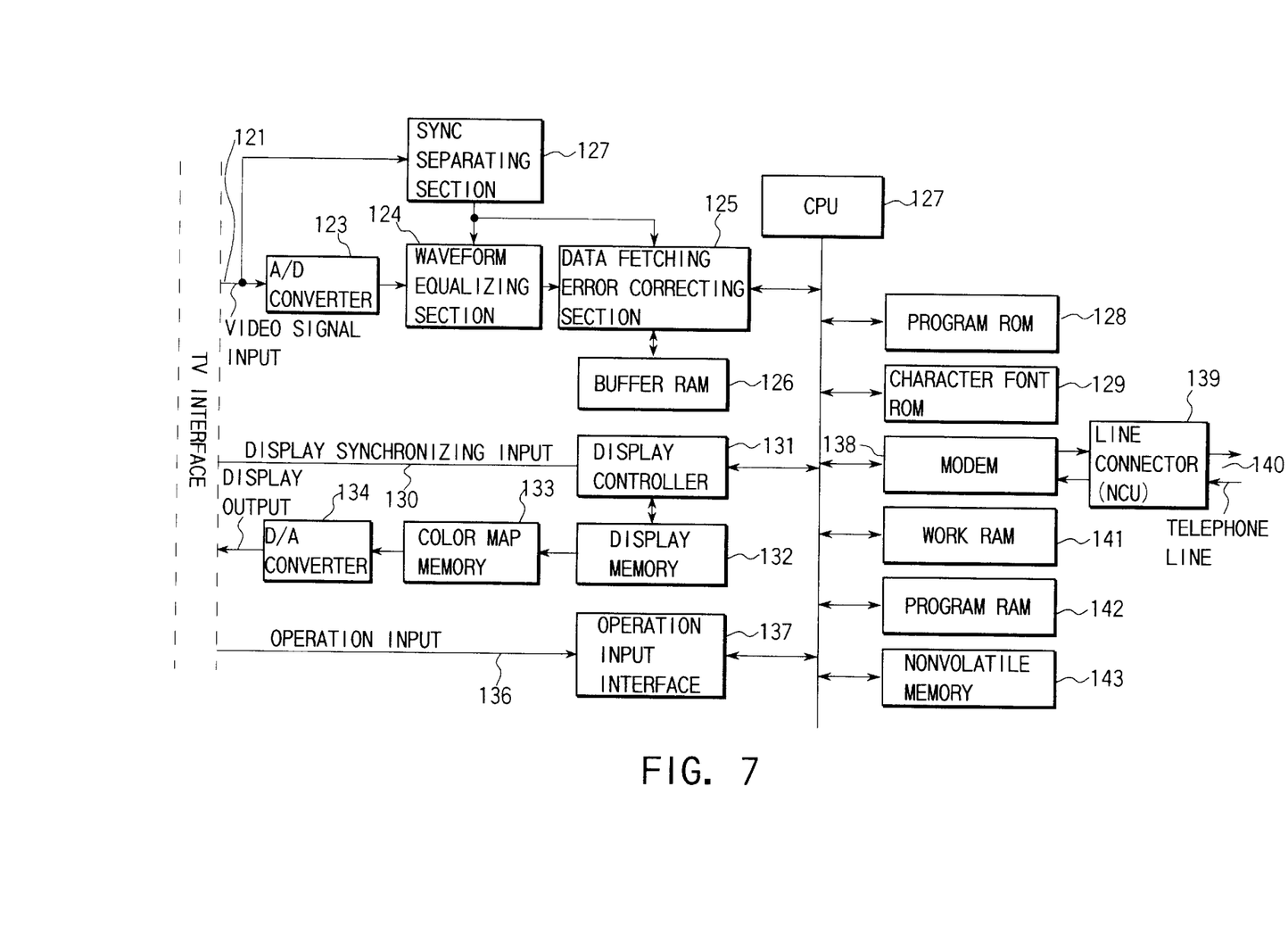
FIG. 7 is a block diagram showing an example of the concrete construction of a text data decoder.

FIG. 7 shows an example of the concrete construction of the text data decoder.

A video signal is inputted into a sync separation section 122 and A/D converter 123 via an input terminal 121. Digital data, as shown in FIG. 1, is superposed on the vertical blanking period of the video signal. Data converted into the digital form in the A/D converter 123 is subjected to the waveform equalization process in a waveform equalizing section 124 and supplied to a data fetching/error correcting section 125.

The data fetching/error correcting section 125 fetches a text signal based on the timing signal from the sync separation section 122 and performs the error correction process. A CPU 127 is operated based on a fixed program stored in a program ROM 128. A character font ROM 129 stores character fonts for displaying characters. Character data can be read out by causing the CPU 127 to address a desired character in the character font ROM 129.

A display synchronizing signal which is synchronized with the operation of the television device is supplied to an input terminal 130. The synchronizing signal is supplied to a display control section 131. The display control section 131 effects the process for reading out data of a display memory 132 in synchronism with reproduction of a television image and writing display data into the display memory 132 in response to a write instruction from the CPU 127.

Data read out from the display memory 132 is supplied to a color map memory 133. The color map memory 133 receives display data as an address input and outputs level data of primary color signals R, G, B corresponding to the address. The level data is converted to analog R, G, B signals by a D/A converter 134 and they are derived from an output terminal as a display signal.

The display signal is synthesized with the television signal by the synthesizing means (not shown) and displayed on the display. Further, the D/A converter 134 can be omitted and the R, G, B signals that are outputted from the color map memory 133 can be used as they are depending on the type of an interface on the display side.

An operation signal generated from the operating section of the remote controller operated by the viewer is inputted via an input terminal 136. The operation signal is fetched by the CPU 127 via an operation input interface (I/F) 137 and then analyzed.

A modem 138 contains a modulator and demodulator to construct a communication control section and is connected to a telephone line 140 via a line connecting section 139. The line connecting section 139 controls connection/disconnection to or from the telephone line 140 and is controlled by the CPU 127.

The CPU 127 is connected to function blocks, that is, the data fetching/error correcting section 125, program ROM 128, character font ROM 129, operation input interface 137, work RAM 141, program RAM 142 and nonvolatile memory 143 via the bus line.

The program RAM 142 is a memory that stores a script (computer program) transmitted from the broadcasting station. The content of the script is interpreted according to an interpreter in the fixed program stored in the ROM 128 by the operation of the viewer and a preset process can be executed according to the procedure.

A fixed identification number (ID) of the reception terminal is stored in the nonvolatile memory 143 and when order data is transmitted to the data collecting station in the teleshopping, for example, the identification number is used. In the data collecting station, the order is determined by recognizing the identification number.

The above circuit construction is used when the multiplexed text broadcasting program is processed. That is, if reception of the multiplexed text broadcasting program is specified by the operation of the remote controller, the CPU 127 is switched to be under the control of the multiplexed text broadcast processing program stored in the program ROM 128. Then, transmitted character data is converted to display data in the character font ROM 129 and stored into the display memory 132 via the display control section 131.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A television device having a text data processing function comprising:
    reception means having at least first and second tuners and capable of receiving and demodulating television broadcasting signals of two channels;
    video signal processing means for independently displaying a video signal which is a reception signal of said first tuner or compressing at least one of video signals which are reception signals of said first and second tuners to simultaneously display the video signals on a display device;

selector means for selectively deriving the television broadcasting signals received by said first and second tuners;

text receiving/demodulating means for receiving an output of said selector means and receiving and demodulating transmitted text data superposed on a data channel contained in the television broadcasting signal and independent from the video/audio signal thereof;

text synthesizing means for synthesizing the text data demodulated by said text receiving/demodulating means with an output of said video signal processing means;

synchronization separation means for separating a synchronizing signal from an output of said selector means; and switching control means for controlling the switching operation of said selector means in a period other than the vertical blanking period based on the synchronizing signal from said synchronization separation means after the channel selection becomes stable in a case where a selected channel of said first tuner is switched to a channel selected by said second tuner.

2. A television device having a text data processing function according to claim 1, further comprising channel selection control means for controlling said first and second tuners to temporarily receive the same channel program in a case where a reception channel of said first tuner is switched to a channel received by said second tuner; and means for setting said second tuner to another channel or setting said second tuner into an OFF state after the selection channel of said first tuner is switched.

3. A television device having a text data processing function comprising:

a first tuner;

a first signal processing system for processing an output signal of said first tuner;

a second tuner;

a second signal processing system for processing an output signal of said second tuner;

a selector for selectively supplying an output signal of one said first and second signal processing systems to a text decoder; and control means for controlling the operation of the television device, wherein said control means keeps the channel selecting states for a preset period of time when said first tuner is selected to receive a channel which is the same as a channel received by said second tuner under a condition that said control means controls said selector to cause an output signal of said second signal processing system to be supplied to said text decoder, controls said selector to supply a reception output of said first tuner to said test decoder when the reception state of said first tuner becomes stable, and controls the switching operation of said selector in a period other than the vertical blanking period of an output signal of said first tuner.

4. A television device having a text data processing function according to claim 3, wherein the text data is inter text data.

* * * * *